(12) United States Patent
Akiyama et al.

(10) Patent No.: US 7,944,524 B2
(45) Date of Patent: May 17, 2011

(54) DISPLAY APPARATUS WITH PARTICULAR LIGHT CONTROL AND LIGHT REFLECTING

(75) Inventors: Takashi Akiyama, Sayama (JP);
Sachiko Kawada, Kodaira (JP)

(73) Assignee: Citizen Holdings Co., Ltd., Tokyo (JP)

( * ) Notice: Subject to any disclaimer, the term of this patent is extended or adjusted under 35 U.S.C. 154(b) by 136 days.

(21) Appl. No.: 12/067,282

(22) PCT Filed: Jun. 1, 2007

(86) PCT No.: PCT/JP2007/061588
§ 371 (c)(1),
(2), (4) Date: Mar. 18, 2008

(87) PCT Pub. No.: WO2008/004402
PCT Pub. Date: Jan. 10, 2008

(65) Prior Publication Data
US 2009/0135334 A1    May 28, 2009

(30) Foreign Application Priority Data

Jun. 2, 2006 (JP) ................................ 2006-154831

(51) Int. Cl.
*G02F 1/1335* (2006.01)
(52) U.S. Cl. ............................. 349/61; 349/63; 349/113
(58) Field of Classification Search ............... 349/63, 349/61, 113
See application file for complete search history.

(56) References Cited

U.S. PATENT DOCUMENTS

| 6,048,071 A * | 4/2000 | Sawayama ............... 362/603 |
| 7,268,840 B2 * | 9/2007 | Akiyama et al. ............ 349/61 |

FOREIGN PATENT DOCUMENTS

| JP | 2000-321993 | | 11/2000 |
| JP | 2001033766 A | * | 2/2001 |
| JP | 2003-57645 | | 2/2003 |
| JP | 2003-5176 | | 8/2003 |

* cited by examiner

*Primary Examiner* — Mike Qi
(74) *Attorney, Agent, or Firm* — Finnegan, Henderson, Farabow, Garrett & Dunner, L.L.P.

(57) ABSTRACT

The present invention is directed to the provision of a high-contrast display apparatus. The display apparatus of the present invention includes a light source, a display section having an electro-optical conversion device for transmitting or scattering light introduced from the light source, light control means for reflecting the light introduced from the light source at a prescribed reflection angle, and a light reflecting member for causing the light reflected by the light control means and transmitted through the electro-optical conversion device to be reflected outside the field of view of a viewer who is viewing the display section straight on.

12 Claims, 3 Drawing Sheets

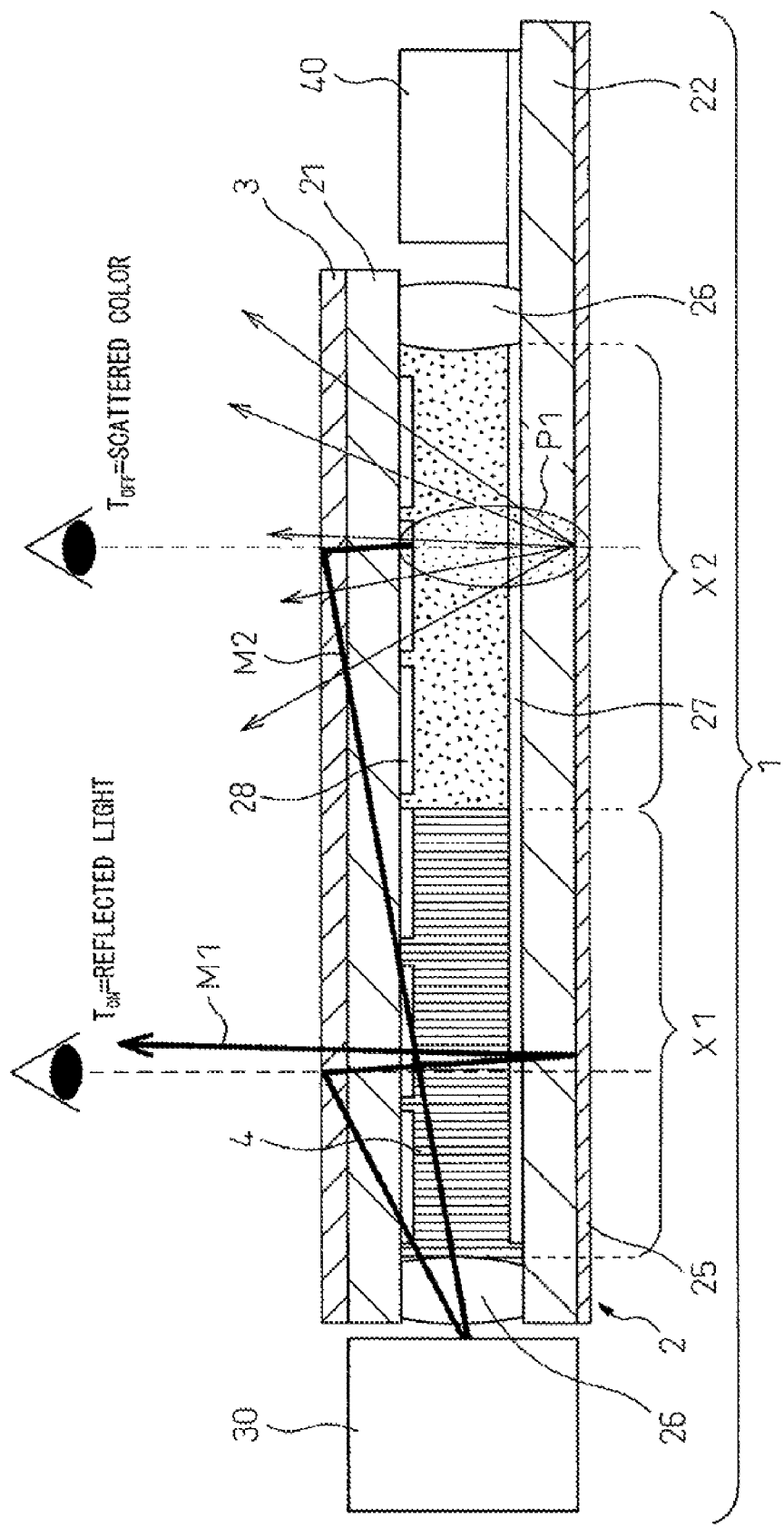

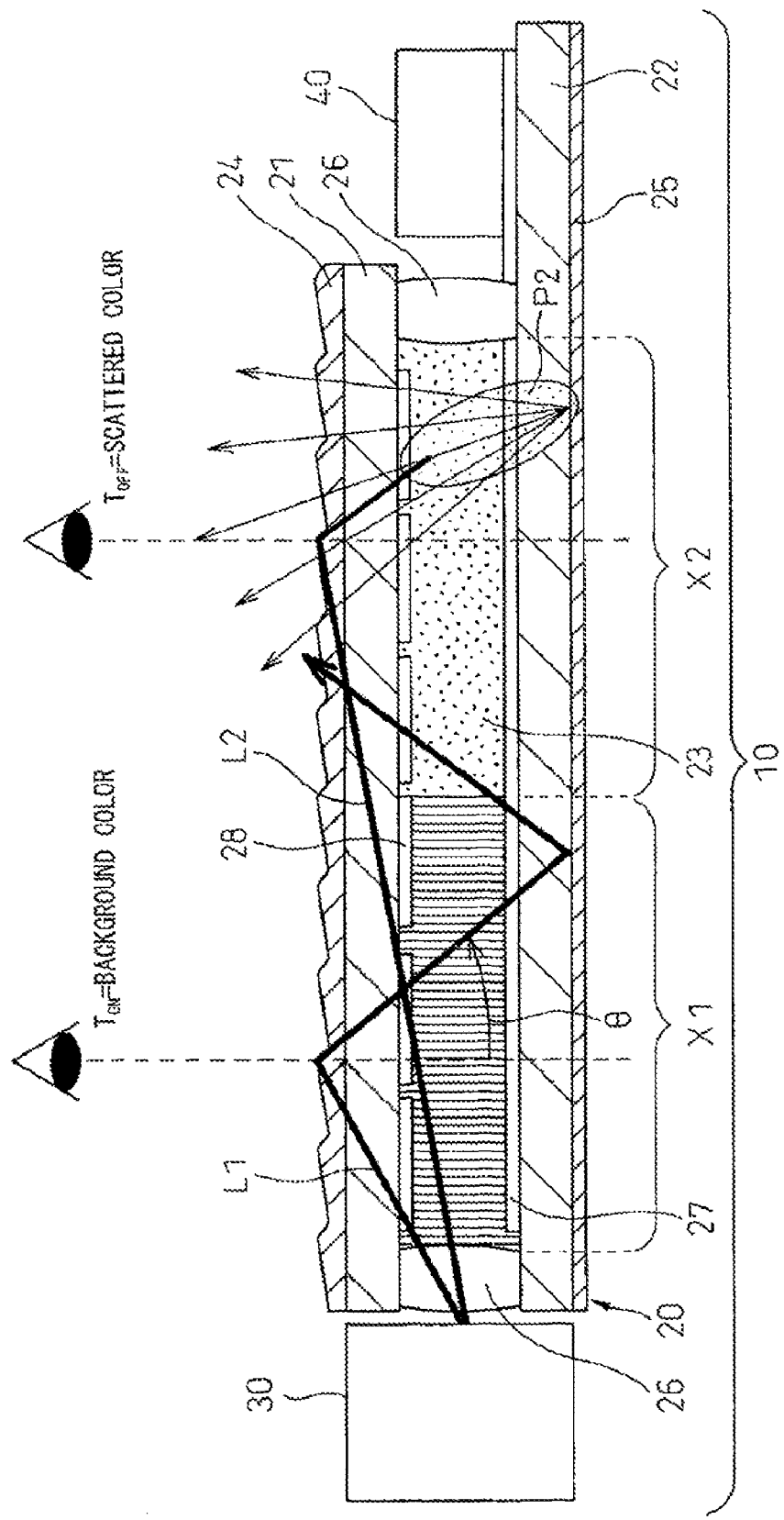

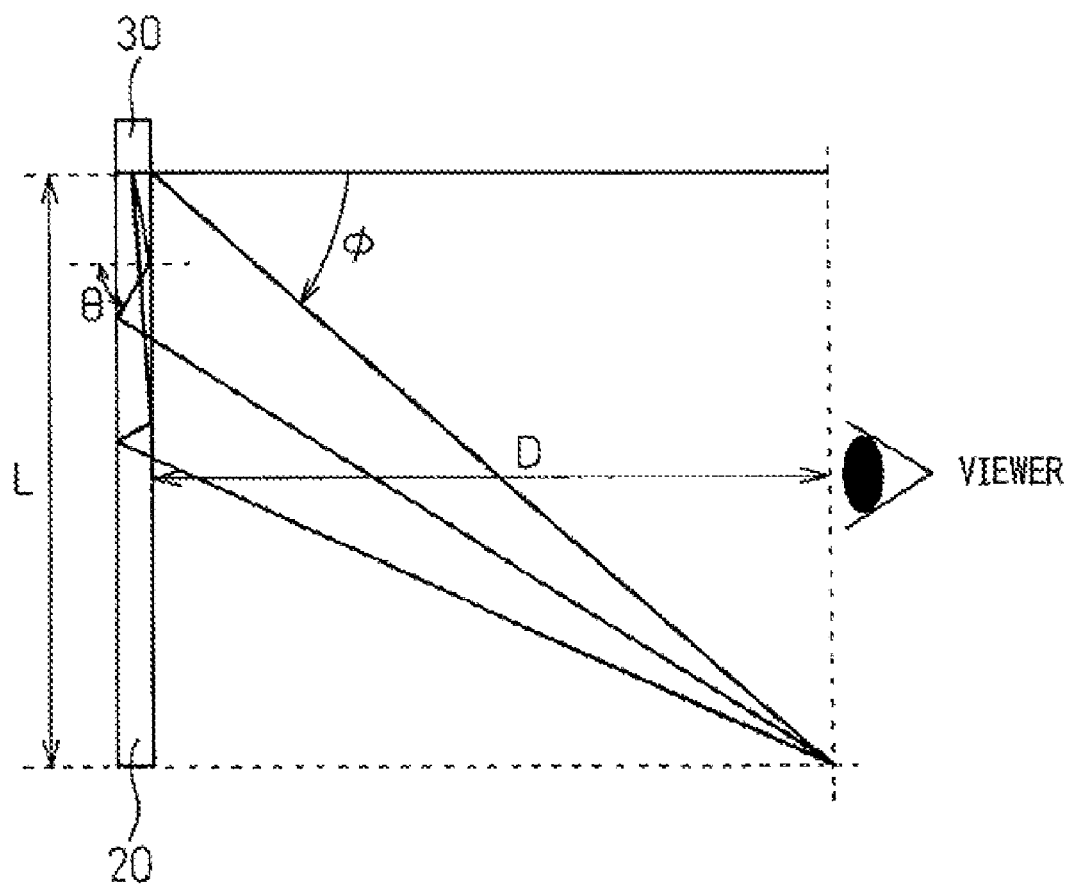

DISPLAY APPARATUS WITH PARTICULAR LIGHT CONTROL AND LIGHT REFLECTING

FIELD OF THE INVENTION

The present invention relates to a display apparatus, and more specifically to a display apparatus that can display high-contrast over the entire display area.

BACKGROUND OF THE INVENTION

In a reflective liquid crystal display apparatus, it is known to add an auxiliary light source to illuminate the reflective liquid crystal display apparatus from an edge thereof (refer, for example, to patent document 1).

FIG. 1 is a diagram schematically showing one example of such a reflective liquid crystal display apparatus.

As shown in FIG. 1, reflective liquid crystal display apparatus 1 comprises a liquid crystal panel 2, an LED light source 30, and an IC circuit 40 for driving liquid crystal panel 2. Liquid crystal panel 2 comprises a first transparent substrate 21, a second transparent substrate 22, a polymer dispersed liquid crystal 4 sandwiched between the first and second transparent substrates, a sealing member 26 for sealing the polymer dispersed liquid crystal 4 therebetween, a first transparent electrode 28 disposed on the inside of first transparent substrate 21, a prism 3 disposed on top of first transparent substrate 21, a second transparent electrode 27 disposed on the inside of second transparent substrate 22, and a reflector 25 disposed on the outside of second transparent substrate 22.

In a region X1 where voltage is applied between the first and second transparent electrodes, Polymer dispersed liquid crystal 4 allows light to freely pass through it (non-scattering mode), and the region thus appears black except for a portion thereof where the light is reflected from the rear reflector. On the other hand, in a region X2 where no voltage is applied, the polymer dispersed liquid crystal 4 scatters the light (scattering mode), and the region thus appears white.

When light introduced from the LED light source 30 into liquid crystal panel 2 is reflected by prism 3 and enters the region X1, the light passes through the liquid crystal layer (non-scattering mode), is reflected by the reflector 25, and emerges on the viewer side (see M1). As a result, the reflected light is observed on the viewer side of the region X1 where voltage is applied.

On the other hand, when light introduced from the LED light source 30 into liquid crystal panel 2 is reflected by prism 3 and enters the region X2, the light is scattered in the liquid crystal layer (see P1) (scattering mode), and the reflected light is not directly observed on the viewer side (see M2). As a result, the region X2 where no voltage is applied appears white, since the reflected light emerges as scattered light which is observed on the viewer side.

Patent document: JP 2003-57645 A

SUMMARY OF THE INVENTION

As described above, in the prior art reflective liquid crystal display apparatus, the light introduced into the liquid crystal panel 2 in a non-scattering mode is observed as reflected light on the viewer side. As a result, the prior art reflective liquid crystal display apparatus described above has not been able to produce a true black display state, resulting in a problem that the contrast (the ratio between the white display produced in the scattering mode and the black display produced in the non-scattering mode) degrades.

Accordingly, it is an object of the present invention to provide a high-contrast reflective display apparatus.

A display apparatus according to the present invention includes a light source, a display section having an electro-optical conversion device for transmitting or scattering light introduced from the light source, light control means for reflecting the light introduced from the light source at a prescribed reflection angle, and a light reflecting member for causing the light reflected by the light control means and transmitted through the electro-optical conversion device to be reflected outside the field of view of a viewer who is viewing the display section straight on.

Preferably, in the display apparatus according to the present invention, the reflection angle is not smaller than 30°, and not larger than 75°, and by so setting the reflection angle, the light reflected by the light control means and transmitted through the electro-optical conversion device can be appropriately reflected outside the field of view of the viewer.

Preferably, in the display apparatus according to the present invention, the electro-optical conversion device distributes scattered light within the field of view of the viewer by scattering the light introduced from the light source. When the electro-optical conversion device is in the non-scattering mode (transmission mode), the light from the light source is not distributed within the field of view of the viewer, but when the electro-optical conversion device is in the scattering mode, the light from the light source is distributed within the field of view of the viewer, thereby achieving black and white display states, respectively.

Preferably, in the display apparatus according to the present invention, the electro-optical conversion device transmits or scatters the introduced light, depending on an applied voltage. As a result Pixels are formed, for example, by transparent electrode patterns arranged in a matrix form, and the application of a voltage is controlled for each pixel so that a desired image can be displayed on the display section.

Preferably, in the display apparatus according to the present invention, the light from the light source is introduced through an edge face of the display section, the light control means is disposed on the viewer side of the display section, and the light reflecting member is disposed on an opposite side of the display section from the light control means.

According to the present invention, since the light from the light source is almost completely prevented from emerging on the viewer side of the electro-optical conversion device in the non-scattering mode, the difference between the black and white display states becomes distinct, and a high-contrast display apparatus can thus be achieved.

BRIEF DESCRIPTION OF THE DRAWINGS

FIG. 1 is a diagram schematically showing the structure of a prior art liquid crystal display apparatus.

FIG. 2 is a diagram schematically showing the structure of a display apparatus 10 according to the present invention.

FIG. 3 is a diagram for explaining the reflection angle θ of light control means 24.

DETAILED DESCRIPTION OF THE PREFERRED EMBODIMENTS

A display apparatus according to the present invention will be described below with reference to the drawings.

FIG. 2 is a diagram schematically showing the structure of the display apparatus 10 according to the present invention.

As shown in FIG. 2, display apparatus 10 comprises liquid crystal panel 20, LED light source 30, and IC circuit 40 for driving liquid crystal panel 20. Liquid crystal panel 20 comprises first transparent substrate 21, second transparent substrate 22, liquid crystal 23 sandwiched between the first and second transparent substrates, sealing member 26 for sealing liquid crystal 23 therebetween, first transparent electrode 28 disposed on the inside of first transparent substrate 21, light control means 24 disposed on top of first transparent substrate 21, second transparent electrode 27 disposed on the inside of second transparent substrate 22, and reflector 25 disposed on the outside of second transparent substrate 22.

First and second transparent electrodes 27 and 28 are actually arrays of transparent electrodes arranged in a matrix form on the inside surfaces of first and second transparent substrates 21 and 22, respectively, and the intersections of first and second electrodes 27 and 28 correspond to display pixels in liquid crystal panel 20.

PNLC (Polymer Network Liquid Crystal) is used as liquid crystal 23. In a region X1 where voltage is applied between the first and second transparent electrodes, liquid crystal 23 functions so as to transmit light therethrough (non-scattering mode), while in a region X2 where no voltage is applied, it functions so as to scatter the light (scattering mode).

Light control means 24 is constructed from a prism having a reflection angle θ such that the light introduced into liquid crystal panel 20 through an edge face thereof is reflected in a direction away from the edge face through which the light was introduced. In the present embodiment, the reflection angle θ of light control means 24 is set at 45° with respect to the normal.

Of the light rays introduced from LED light source 30 into liquid crystal panel 20, any light ray that is going to enter the region X1 is reflected at the reflection angle θ by light control means 24 in a direction that causes the light to substantially move away from the region X1. As described earlier, since liquid crystal 23 is in the non-scattering mode in the region X1, the light is transmitted through it. However, the transmitted light is reflected at the reflection angle θ by reflector 25 in a further distant direction (see L1). As a result, the viewer viewing liquid crystal panel 20 straight on cannot observe light, but can only observe the background color of liquid crystal panel 20. In other words, the region X1 appears black.

On the other hand, of the light rays introduced from LED light source 30 into liquid crystal panel 20, any light ray that is going to enter the region X2 is reflected at the reflection angle θ by light control means 24 in a direction that causes the light to substantially move away from the region X2. As earlier described, since liquid crystal 23 is in the scattering mode in the region X2, the light is scattered (see P2). Even if the light reflected at the reflection angle θ enters the region X2 (see L2), the light is scattered and emerges on the viewer side of the substantially same region, and the viewer viewing liquid crystal panel 20 straight on can thus observe the scattered light. In other words, the region X2 appears white.

In this way, in the region X1 corresponding to the non-scattering mode of liquid crystal 23 in display apparatus 10, since the light from LED light source 30 is reflected at a large angle relative to the normal and is thus directed outside the field of view of the viewer, the viewer can only observe the background color of liquid crystal panel 20, and the display thus appears black. On the other hand, in the region X2 corresponding to the scattering mode of the liquid crystal 23 in display apparatus 10, the light from LED light source 30 is scattered, and the scattered light is observed by the viewer, so that the display appears white. In the prior art liquid crystal display apparatus, the light from the light source was observed on the viewer side not only in the scattering mode but also in the non-scattering mode. By contrast, in display apparatus 10 according to the present invention, the light from the light source is almost completely prevented from emerging on the viewer side in the non-scattering mode. Accordingly, in display apparatus 10 of the present invention, the difference between the black and white display states becomes distinct, and a high-contrast display can thus be achieved.

FIG. 3 is a diagram for explaining the reflection angle θ of light control means 24.

In FIG. 3, L indicates the length of liquid crystal panel 20, and D the distance between liquid crystal panel 20 and the viewer.

As earlier described, to cause the region X1 in display apparatus 10 to appear black, the light reflected first by light control means 24 and then by reflector 25 should be directed outside the region extending from the portion directly above the edge of liquid crystal panel 20 that faces LED light source 30 to the portion directly above the edge of the liquid crystal panel 20 opposite from LED light source 30. Here, if $\phi=\tan^{-1}(L/D)$, then $\phi$ and the reflection angle θ should be set to satisfy the following relation (1).

$$\theta \geq \phi + 30° \quad (1)$$

In an ordinary display apparatus, $\phi$ satisfies the following relation (2) from the relationship between L and D.

$$0° < \phi \leq 45° \quad (2)$$

From the above relations (1) and (2), it is preferable that the reflection angle θ be set within a range not smaller than 30°, and not larger than 75°, i.e., when the reflection angle θ of the light control means 24 satisfies the above condition, liquid crystal 23 can produce a good black display state, and a high-contrast display can thus be achieved.

While the above embodiment has been described for display apparatus 10 that uses PNLC for liquid crystal panel 20, the present invention is equally applicable to other kinds of displays as long as the display is constructed using an electro-optical conversion device capable of electrically switching between the non-scattering and scattering modes.

What is claimed is:

1. A display apparatus comprising:
   a light source;
   a display section having an electro-optical conversion device for transmitting or scattering light introduced from said light source;
   light control means for reflecting the light introduced from said light source at a prescribed reflection angle; and
   a light reflecting member for causing the light reflected by said light control means and transmitted through said electro-optical conversion device to be reflected outside the field of view of a viewer who is viewing said display section straight on.

2. The display apparatus according to claim 1, wherein said reflection angle is not smaller than 30°, and not larger than 75°.

3. The display apparatus according to claim 1 or 2, wherein said electro-optical conversion device distributes scattered light within the field of view of said viewer by scattering the light introduced from said light source.

4. The display apparatus according to claim 1, wherein said electro-optical conversion device transmits or scatters said introduced light, depending on an applied voltage.

5. The display apparatus according to claim 1, wherein the light from said light source is introduced through an edge face of said display section, said light control means is disposed on a viewer side of said display section, and said light reflecting member is disposed on an opposite side of said display section from said light control means.

6. The display apparatus according to claim 3, wherein the light from said light source is introduced through an edge face of said display section, said light control means is disposed on a viewer side of said display section, and said light reflecting member is disposed on an opposite side of said display section from said light control means.

7. The display apparatus according to claim 2, wherein said electro-optical conversion device transmits or scatters said introduced light, depending on an applied voltage.

8. The display apparatus according to claim 7, wherein the light from said light source is introduced through an edge face of said display section, said light control means is disposed on a viewer side of said display section, and said light reflecting member is disposed on an opposite side of said display section from said light control means.

9. The display apparatus according to claim 2, wherein the light from said light source is introduced through an edge face of said display section, said light control means is disposed on a viewer side of said display section, and said light reflecting member is disposed on an opposite side of said display section from said light control means.

10. The display apparatus according to claim 3, wherein said electro-optical conversion device transmits or scatters said introduced light, depending on an applied voltage.

11. The display apparatus according to claim 10, wherein the light from said light source is introduced through an edge face of said display section, said light control means is disposed on a viewer side of said display section, and said light reflecting member is disposed on an opposite side of said display section from said light control means.

12. The display apparatus according to claim 4, wherein the light from said light source is introduced through an edge face of said display section, said light control means is disposed on a viewer side of said display section, and said light reflecting member is disposed on an opposite side of said display section from said light control means.

* * * * *